United States Patent
Ichihara et al.

(10) Patent No.: US 6,212,025 B1
(45) Date of Patent: Apr. 3, 2001

(54) MAGNETIC RECORDING AND REPRODUCING METHOD AND APPARATUS EMPLOYING A MAGNETICALLY CONTINUOUS MAGNETIC FILM

(75) Inventors: Katsutaro Ichihara, Yokohama; Tsutomu Tanaka, Tokyo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/122,798

(22) Filed: Jul. 27, 1998

(30) Foreign Application Priority Data

Sep. 9, 1997  (JP) .................................................... 9-244021

(51) Int. Cl.⁷ ........................................................ G11B 5/02
(52) U.S. Cl. ................................ 360/55; 360/58; 360/51; 360/131
(58) Field of Search ................................. 360/55, 58, 31, 360/51, 131, 135; 428/694 T, 694 BA, 694 TR, 694 BN, 694 RE (56) References Cited

U.S. PATENT DOCUMENTS 5,679,473 * 10/1997 Murayama et al. ............. 428/694 T
5,989,674 * 11/1999 Marinero et al. .................... 428/65.3

OTHER PUBLICATIONS

Kryder et al, "Direct Overwrite in Magneto–Optical Recording Technology", Japanese Journal of Applied Physics, vol. 28 (1989) Supplement 28–3, pp. 3–9.*

Lin, "Thermomagnetically Induce Nucleation and Growth of Domains in GdTbFeCo", Japanese Journal of Applied Physics, vol. 28 (1989) Supplement 28–3, pp. 23–26.*

* cited by examiner

*Primary Examiner*—Alan T. Faber
(74) *Attorney, Agent, or Firm*—Oblon, Spivak, McClelland, Maier & Neustadt, P.C.

(57) ABSTRACT

A magnetic recording and reproducing method comprises the steps of forming magnetic domain walls in reference positions on a magnetic recording medium having a recording layer consisting of a magnetic film in which a nucleation coercivity for changing a direction of magnetization is larger in strength than a domain wall motion coercivity for shifting the magnetic domain walls and which has substantially only magnetic regions, the recording layer having a track and the reference positions being regularly spaced in the direction of length of the track, and applying to the magnetic recording medium a recording field which is smaller in strength than the nucleation coercivity but larger than the domain wall motion coercivity to thereby shift each of the domain walls in the recording layer from its reference position forward or backward in the direction of length of the track, whereby information is recorded.

28 Claims, 3 Drawing Sheets

MAGNETIC RECORDING AND REPRODUCING METHOD AND APPARATUS EMPLOYING A MAGNETICALLY CONTINUOUS MAGNETIC FILM

BACKGROUND OF THE INVENTION

The invention relates to a magnetic recording and reproducing method and apparatus adapted for magnetic disk drives used with personal computers, large computers, communications servers, and so on.

Magnetic disk units, particularly hard disk drives (HDDs) using rigid magnetic disks, have features of large storage capacity, fast accessibility, and high data transfer rates and have been widely used as peripheral storage units of information processing units such as personal computers, large computers, communications servers, etc. As the MPU operations speed increases and communications infrastructure improves and expands, the demand for increased storage capacity of the HDDs will increase.

In order to increase the storage capacity of the HDDs, it is required to increase the surface recording density. Constant endeavors have been made to increase the recording density from various aspects of technologies, such as signal processing technologies typified by PRML (partial response maximum likelihood), high-accuracy head positioning technologies, tri-bology technologies important to interface between head and disk, head technologies typified by giant magnetoresistance (GMR) heads, and magnetic disk medium technologies. The size of recording cells formed on a recording medium is reduced as the recording density increases, which is accompanied by a reduction in leakage signal magnetic fields from the medium that contribute to the reproduction of signals. Therefore, in order to ensure a high signal-to-noise ratio (SNR) of reproduced signals, it is required to reduce noise associated with the medium.

Conventional magnetic disks use a thin film made of an aggregate of Co-based magnetic crystal particles for their recording surface. With such a thin film consisting of magnetic particles, magnetic transition regions are easy to fluctuate due to exchange interaction of the magnetic crystal particles. In order to reduce medium noise, therefore, it is required Ito separate the particles from one another with a nonmagnetic material. That is, to reduce noise, the volume particle content must be lowered, which results in a further reduction in signal field. Thus, the effect of improving the signal-to-noise ratio by noise reduction can be little expected.

Even in the case where the exchange interaction of magnetic particles is completely broken, the fluctuation of magnetic transition corresponding to the particle size is inevitable in principle. In order to further reduce medium noise, it is needed to reduce the size of magnetic particles. The smaller the magnetic particles, the smaller the magnetic energy of the particles. For example, the particle size required to make a high-density recording of the 10 Gb/in$^2$ class will be at most 10 nm. At this level of particle size, a low magnetic energy of the magnetic particles causes a problem of magnetic stability against thermal agitation at room temperature.

The way to increase the magnetic energy of the magnetic particles with their size kept small is to increase their magnetic anisotropy energy. Excessively high magnetic anisotropy energy will make the recording saturation magnetic field required with reversal of magnetization so large as to exceed the ability of a recording head. While an attempt is being made to use a soft magnetic material for magnetic poles of a recording head, it cannot be expected to improve the head recording capability as long as the recording track width is made narrower as the recording density increases.

Thus, with the conventional magnetic recording technique that uses a magnetic recording medium having a recording layer consisting of magnetic particles, in order to reduce medium noise sufficiently for increased recording density, it is required to reduce the size of magnetic particles constituting the recording layer. In order to overcome thermal agitation with the particle size kept small, it is needed to make large the magnetic anisotropy energy of the magnetic particles. In obtaining a sufficient overwrite erase ratio with a head adapted for narrow tracks, there is a drawback that the upper limit of the magnetic anisotropy energy is limited, thus the increase of recording density has been limited.

In general, a system expected as the magnetic recording technique that overcomes the limitations of recording density is vertical magnetic recording. In the vertical magnetic recording, as with the longitudinal magnetic recording, the medium recording layer is composed of magnetic crystal particles. The vertical magnetic recording is distinct from the longitudinal magnetic recording in that the recording layer has the axis of easy magnetization in a direction perpendicular to its surface. Unlike the longitudinal magnetic recording, the vertical magnetic recording has a feature that, even if the size of recording cells is small, the state of magnetization will not change under the influence of a demagnetizing field and hence the recording layer can, in principle, be increased in thickness. It is thought that there is the possibility that all the conditions of low noise, high thermal agitation resistance, and high recording sensitivity may be satisfied, provided that the thickness of the recording layer can be increased. That is, even if the size of particles is made small, the thermal agitation resistance can be increased with increasing layer thickness and a material having excessive magnetic anisotropy energy need not necessarily be used.

In the vertical magnetic recording as well, it is needed that the recording layer must be reduced, to some degree, in thickness because of requirement of uniformly magnetizing the recording layer for recording in the direction of its thickness and applying as abrupt magnetic fields as possible to the recording layer. This is inconsistent with the above-described feature of the vertical magnetic recording. A method has been proposed which, through the use of a two-layer recording medium having a soft magnetic layer as the underlying layer, allows abrupt recording magnetic fields to be applied to the recording layer to thereby produce uniform recording in the direction of its thickness even if it is thick. However, if a soft magnetic film is formed over a large-area surface such as a magnetic recording medium, random magnetic domain walls become easy to be formed, independently of recording patterns. And the domain walls change their position with ease, resulting in the occurrence of many burst-like errors.

As described above, the conventional magnetic recording techniques using an aggregate of magnetic particles as the recording layer of a magnetic recording medium are encountering the limits of improvement in the recording density under the circumstances that:

(1) the size of the magnetic particles constituting the recording layer has to be made small in order to reduce medium noise down to a sufficient level; As described above, the conventional magnetic recording techniques using an aggregate of magnetic particles as the recording layer of a magnetic recording medium are encountering the limits of improvement in the recording density under the circumstances that:

(2) the size of the magnetic particles has to be made small in order to reduce medium noise down to a sufficient level;

(3) even if the particle size is reduced, the magnetic anisotropy energy of the magnetic particles has to be made large in order to overcome thermal agitation; and (4) trying to obtain a sufficient overwrite erase ratio with a narrow-track head results in that the upper limit of the magnetic anisotropy energy is limited.

The vertical magnetic recording, which in principle allows higher recording densities than the longitudinal magnetic recording, has the possibility that all the conditions of low medium noise, high thermal agitation resistance, and high recording sensitivity may be satisfied if the recording layer thickness is reduced. Further, its requirements of making uniform recordings in the direction of thickness of the recording layer and applying abrupt recording magnetic fields to the recording layer result in a basic problem that it is inadvisable to make the recording layer thickness large. Moreover, when a two-layer medium having a soft magnetic film as its underlying layer is used, random magnetic domain walls become easy to be formed, independently of recording patterns, and the domain walls change their position with ease, resulting in a problem of the occurrence of many burst-like errors.

BRIEF SUMMARY OF THE INVENTION

It is an object of the present invention to provide a magnetic recording and reproducing method and apparatus which, instead of using a recording layer consisting of an aggregate of magnetic particles, uses a magnetically continuous recording layer which, unlike the conventional magnetic recording medium, has no nonmagnetic region between each magnetic particle and allows high recording density, low noise, high thermal agitation resistance and high recording sensitivity requirements to be satisfied with ease.

To attain the object, the present invention uses a magnetic recording medium having a recording layer consisting of a magnetic film (magnetically continuous film) in which a nucleation coercivity (Hn) is larger in strength than a domain wall motion coercivity (Hw) and which has substantially no nonmagnetic regions and hence is magnetically continuous. In the case where, Hn indicates a field being required for generating a nuclear of magnetic domain and Hw indicates a field being required for moving existing magnetic domain walls. Magnetic domain walls are formed in advance in reference positions on the recording layer which are regularly spaced in the direction of length of the track on the recording layer.

A recording of information is made by applying a recording field (Hr) such that Hn>Hr>Hw to the recording medium through a recording head and shifting the position of each of the domain walls from its reference position forward or backward in the direction of the track length (modulation of the position of the domain walls). More specifically, a recording pattern signal corresponding to information to be recorded is produced in synchronization with a reference signal of a fixed period corresponding to the reference positions and the recording head is driven by the recording pattern signal to apply the recording field Hr such that Hn>Hr>Hw.

The recorded information is reproduced by identifying in which direction the position of each domain wall in the recording layer (the modulated position of the domain wall after recording) has been shifted from its corresponding reference position (the unmodulated position prior to recording). More specifically, the recorded information is reproduced by identifying whether a signal corresponding to each domain wall in a reproduced signal obtained from the recording medium by a reproducing head leads or lags in time relative to a reference signal corresponding to the unmodulated positions of the domain walls. Whether the signal leads or lags can be identified as the direction in which each peak position in the reproduced signal has been shifted relative to the reference signal.

The formation of the domain walls (initial domain walls) in the recording layer prior to information recording can be performed by applying an initial domain wall forming field which is larger in strength than the nucleation coercivity Hn. The formation of the initial domain walls may be carried out as a process in a factory or by a magnetic recording and reproducing apparatus using a recording head. To implement a magnetic recording and reproducing apparatus with a higher recording density, it is desirable to form the initial domain walls in the closest pattern, that is, at the highest density that the system allows from an operational viewpoint.

The recording layer of magnetic recording media conventionally used for magnetic recording is an aggregate of magnetic particles and consists of magnetic crystal particles and interparticle nonmagnetic or feeble-magnetic regions. In such a recording layer, magnetization transition regions are formed by inter particle nonmagnetic regions, not by magnetic domain walls. For this reason, there is no need of taking the shift of magnetic domains into consideration. Information recording is performed by applying a recording field which is basically larger in strength than a nucleation coercivity of magnetic particles.

However, the shift of domain walls must be taken into consideration in the magnetic recording medium in which there is very little nonmagnetic or feeble-magnetic material between each particle and particles are not separated from one another, that is, in the so-called magnetically continuous film in which there is substantially no nonmagnetic interparticle regions as in the recording layer used in the present invention. The relationship of magnitude between the domain wall motion coercivity Hw and the nucleation coercivity Hn varies according to the degree of interparticle continuity. In general, Hn>Hw when the continuity is maintained well. The present invention positively uses a magnetically continuous film that satisfies that condition as a recording layer. The magnetization transition regions (magnetic domain walls) formed in such a magnetically continuous film have a desirable linear form since they have no fluctuation at the particle size level unlike magnetization transition regions in the conventional magnetic film consisting of magnetic particles.

With the conventional magnetic particle-based medium, the direction of magnetization conforms to the direction of a recording field with a probability of approximately unity when the recording field Hr is stronger than the reversing field Hn. When Hr<Hn, on the other hand, no reversal of magnetization occurs with a probability of approximately zero. Thus, a value close to Hn can be used for Hr and a magnetization transition region is formed substantially at the same time the recording field is switched.

With a domain wall shifting type medium used in the present invention, the speed at which the domain wall shifts is proportional to the difference, Hr−Hw, between the recording field Hr and the nucleation coercivity Hn. In order to shift the domain wall fast, it is required to increase that difference. In such a case, at the moment the recording field is switched, the domain wall that has just shifted in a certain direction will shift a little in the opposite direction. This is due to the magnetic field distribution in the head. For this reason, the domain wall shifting type of medium has heretofore been considered unavailable because of the occurrence of jittery noise resulting from domain wall shifts. This is because, unlike the reversal of magnetization, in the domain wall shift, the recording threshold is indefinite. Thus, the domain wall shifting type of medium has been regarded as unsuitable for magnetic recording in which magnetization transition position is used for information identification.

In contrast, in the present invention, information is identified not by the domain wall position itself but by the position of a domain wall after recording (the modulated position of a domain wall) relative to the initial position of that domain wall before recording (the unmodulated position of that domain wall). Therefore, the present invention allows both the fast domain wall shift and the low jittery noise characteristic to be achieved.

Thus, in the present invention, as a magnetic recording medium use is made of a domain wall shifting type of medium having a recording layer consisting of a magnetically continuous film which has substantially no nonmagnetic regions, as opposed to the conventional magnetic particle-based medium. Even if the recording density is increased, since the medium noise and thermal agitation resistance are irrelevant to the magnetic particle size, high recording density, low noise and high thermal agitation resistance can be achieved.

Furthermore, by recording and reproducing information employing the direction in which a domain wall has shifted with respect to its initial or reference position determined in the initial domain wall forming process, both the high-speed domain wall shift and the low noise characteristic can be achieved, resulting in a high recording density.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
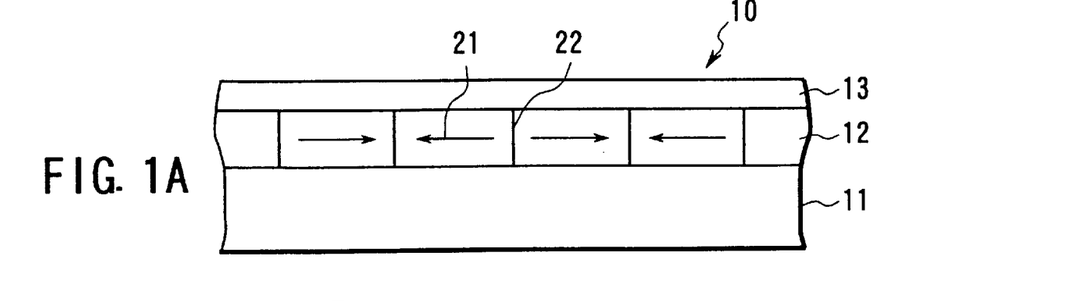
FIGS. 1A, 1B, 1C, 1D and 1E are conceptual diagrams for use in explanation of a magnetic recording and reproducing method according to an embodiment of the present invention.
Figure 1B:
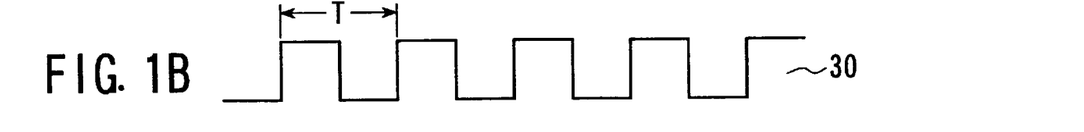
Figure 1C:
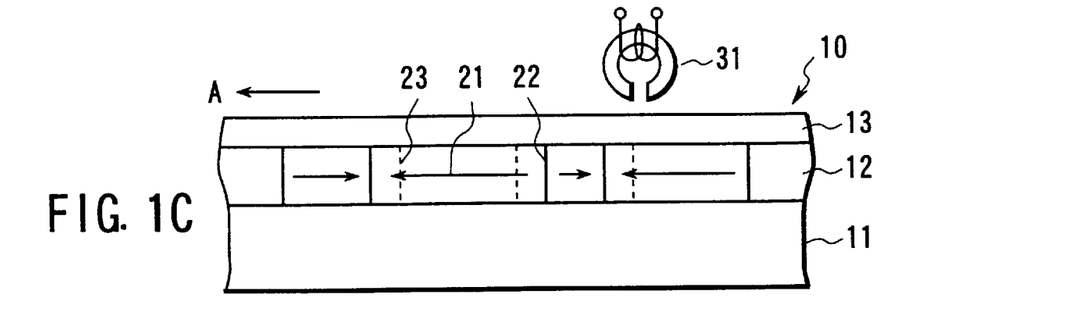
Figure 1D:
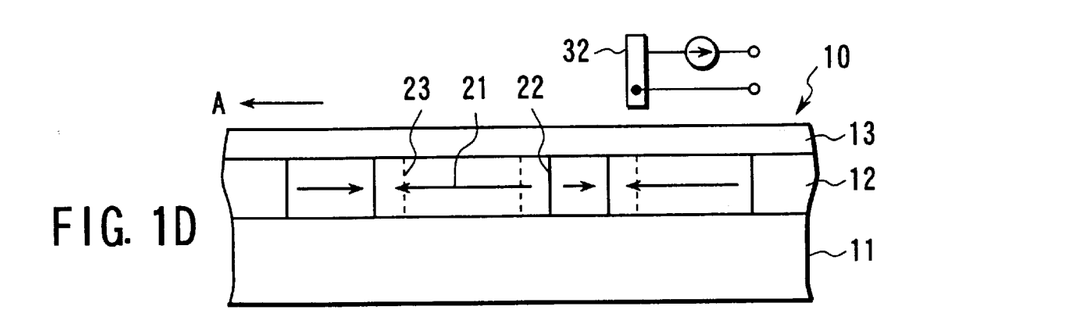
Figure 1E:
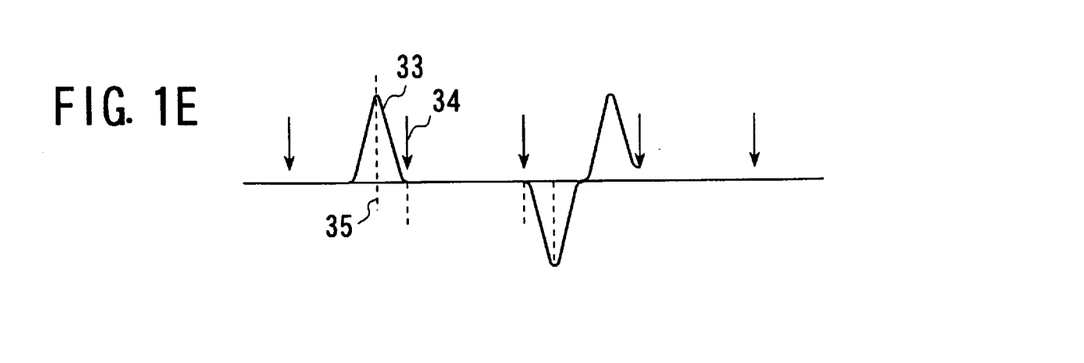

Referring to FIGS. 1A through 1E, there are conceptually illustrated a magnetic recording and reproducing method according an embodiment of the present invention. More specifically, FIG. 1A shows a magnetic recording medium in the initial domain wall formed state, FIG. 1B shows a reference signal waveform, FIG. 1C shows a recording operation, FIG. 1D shows a reproducing operation, and FIG. 1E shows reproduced signal waveforms.

A magnetic recording medium indicated generally at 10 is a magnetic disk by way of example. The magnetic disk is produced by directly forming over the surface of a glass substrate 11 a CoPt film of about 20 nm in thickness serving as a recording layer 12 by means of sputtering techniques directly and then coating the recording layer 12 with a C film 13 of about 10 nm in thickness serving as a protective film 13, directly. The recording layer 12 of CoPt is a magnetically continuous film, i.e., a magnetic film which has substantially no interparticle nonmagnetic regions, and has a nucleation coercivity (Hn) and a domain wall motion coercivity (Hw), which are related such that Hn>Hw.

In the state prior to information recording, as shown in FIG. 1A, magnetization 21 is formed in the direction of length of the track in the recording layer 12 and magnetic domain walls are formed regularly spaced, preferably at the closest spacing that the apparatus allows in system implementation. The magnetization 21 and the domain walls 22 can be formed by periodically applying a magnetic field larger in strength than the nucleation coercivity (Hn) onto the magnetic recording medium 10 in accordance with a reference signal 30 of a constant period shown in FIG. 1B. The formation of the magnetization and the domain walls may be performed by users using a record head provided in the magnetic recording and reproducing apparatus or as a factory step before shipment of the apparatus. The positions of the magnetic domain walls 22 in the initial domain formed state are referred to as the reference positions.

Information recording is made onto the magnetic recording medium by, while moving the recording medium 10 in the initial domain wall formed state as shown in FIG. 1A in the direction of arrow A as shown in FIG. 1C, applying a recording magnetic field (Hr) such that Hn>Hr>Hw to the recording medium in the right or left direction of FIG. 1C using a recording head 31 of an induction type which receives a recording pattern signal corresponding to information to be recorded and thereby shifting the magnetic domain walls 22 from their respective reference positions 23 forward or backward in the direction of track length (i.e., in the right or left direction of FIG. 1C).

The information thus recorded on the magnetic recording medium 10 is reproduced by identifying in which direction each domain wall has shifted from its respective reference position 23. Specifically, while moving the recording medium 10 in the direction of arrow A as shown in FIG. 1D, a reproduced signal is obtained from the recording medium through a reproducing head 32 consisting of an MR or GMR head by way of example.

In FIG. 1E, there are illustrated waveforms of reproduced signals 33 when an MR head is used as the reproducing head 32. An arrow 34 indicates a reference signal position corresponding to the reference position 23, and 35 denotes a peak position of the reproduced signal 33. The peak position 35 of the reproduced signal 33 corresponds to the position of a magnetic domain wall 22 after recording shown in FIG. 1C. Thus, the recorded information can be reproduced by identifying in which direction the peak position 35 of the reproduced signal 33 has shifted in time relative to the corresponding reference signal position 34, i.e., whether the peak position leads or lags with respect to the reference signal position.

Next, the embodiment will be described more specifically.

The CoPt film, the recording layer 12 of the magnetic recording medium 10, is formed on the glass substrate at room temperature by means of a pure Ar gas sputtering process. The CoPt film produced by this process is a magnetically continuous film in which magnetization is oriented in the film plane and, as described previously, has a nucleation coercivity (Hn) and a domain wall motion coercivity (Hw). Examination of the hysteresis characteristics of the CoPt film by a vibration specimen type of magnetometer (VSM) indicated that the saturation magnetization (Ms) is 800 emu/cc, the remnant magnetization (Mr) is 6000 emu/cc, the coercive force (Hc) is 2 kOe, and the coercive force squareness ratio (S*) is 0.75.

The coercive force obtained by the measurement of the hysteresis characteristics (major loop) using the VSM is defined as follows: When an external magnetic field is reduced in the state where the recording layer 12 of the magnetic recording medium 10 is saturated, i.e., the state where the recording layer is uniformly magnetized in the right direction of FIG. 1A without any magnetic domain wall, left-pointing reversal of magnetization is produced locally in the recording medium by a strong demagnetizing field produced in the vicinity of its end portion, forming a magnetic domain wall. This magnetic domain wall shifts and goes into the remanent state of magnetization. When a reverse magnetic field is applied and gradually increased in strength, the right-pointing magnetized region and the left-pointing magnetized region eventually become equal in area to each other. The external field at that time indicates the coercive force (Hc).

The coercive force (Hc) is an external field which is close to the domain wall motion coercivity (Hw) and maintains a balance between the right-pointing domain wall shifted from the remanent state and the left-pointing domain wall. Thus, a large amount of the right-pointing magnetization is involved until the point of balance is reached. The demagnetizing field acts in the direction to accelerate the shift of the domain wall. The coercive force (Hc) obtained by the major loop measurement is therefore smaller in strength than the domain wall motion coercivity (Hw) inherent in the recording layer 12.

The domain wall motion coercivity (Hw) was measured by applying a gradually increasing external magnetic field to the recording layer 12 of the recording medium 10 which is in the AC demagnetized state. In this case, since the right-pointing magnetization and the left-pointing magnetization are balanced in the initial domain wall state, the demagnetizing field applied to the domain wall takes the same value for both the right-pointing and the left-pointing magnetization. Examination of a magnetic field at which the domain wall obviously starts to shift showed that Hw=2.4 kOe.

The nucleation coercivity (Hn) was measured by the following method. The magnetic recording medium 10 formed as a magnetic disk is set in a spin stand type of disk performance evaluation apparatus and then the disk is uniformly magnetized over a predetermined range of radii. Here, the predetermined range of radii refers to an arbitrary area of the disk for which disk performance evaluation is to be performed, for example, an area ranging in radius from 15 to 20 mm, for the purpose of demonstrating the effect of the present invention at experimental stage. When the disk is uniformly magnetized around, there never occurs the reversal of magnetization due to application of a large demagnetizing field at the sample end. Even after the magnetic field is removed, the uniformly magnetized state, i.e., the state where there is no domain wall, can be realized.

In the state where there is no domain wall, a magnetic field produced by the recording head 31 is gradually increased in strength to detect the presence or absence of a magnetization reversal signal. When the recording field reaches the nucleation coercivity (Hn), the magnetization reversal signal is obtained. The recording field that corresponds to a threshold for the magnetization reversal signal is Hn. The nucleation coercivity (Hn) thus obtained is Hn=3.5 kOe, which confirms that the magnetic recording medium sample produced in the above manner satisfies the condition of the present invention, Hn>Hw.

Next, an experiment was conducted to confirm whether the domain walls can shift on the recording layer 12 by application of a recording field that is smaller in strength than the nucleation coercivity (Hn) and larger than the domain wall motion coercivity (Hw). The experiment was conducted under conditions that a recording field of 3 kOe is applied at a frequency of 120 kfci by the recording head 31 of induction type to the magnetic domain walls 22 produced at a density of 150 kfci with a magnetic field larger than Hn applied beforehand to the recording layer 12. Observation of a reproduced signal detected by the MR replay head 32 from the recording medium 10 by the use of a spectrum analyzer showed that a peak appears in the position of 120 kfci in addition to the original position of 150 kfci and the domain walls 22 can be shifted under a recording field Hr such that Hn>Hr>Hw.

The appearance of peaks in the positions of 120 kfci and 150 kfci in the reproduced signal seems to be due to that, when a recording field (Hr) above the domain wall motion coercivity (Hw) is applied to the 150-kfci domain wall positions with the spatial distribution of the recording field, the domain walls shift in accordance with a pattern of 120 kfci, otherwise, the domain walls remains in the original 150-kfci positions. Actually, it was confirmed that when recordings are made on the same track many times at 120 kfci with a recording field Hr such that Hn>Hr>Hw, the reproduced signal gradually changes to a signal of 120 kfci only.

The basic experiment demonstrated that the application of a recording field Hr such that Hn>Hr>Hw allows the initially formed domain walls 33 to shift without the formation of new domain walls and made it clear that with the conventional magnetic recording and reproducing system, fast overwriting is impossible.

Next, the recording and reproducing method of this embodiment will be described more specifically with the results of the basic experiments in mind.

As shown in FIG. 1A, the magnetic domain walls 22 are formed on the recording layer 12 by applying a magnetic field larger than the nucleation coercivity Hn thereto in accordance with the reference signal 30 of FIG. 1B. The positions of the respective domain walls 22 at this time are their reference positions. That is, the domain walls are arranged regularly at intervals dependent on the frequency of the reference signal 30. The timing of reversal of the magnetic field at the recording head 31 is set to the rising edge of the reference signal of FIG. 1B. In this case, an induction type of thin film head having a saturation magnetic flux Bs of 1.6 T was used as the recording head 31.

The gap length of the recording head was 0.2 μm and the track width was 1 μm. The flying height of the recording head 31 from the recording medium 10 was set to 20 nm. In this case, the magnetic field applied to the recording medium 10 was estimated at about 4 kOe from the results of a recording experiment for the input/output characteristic, overwrite characteristic and noise characteristic using a CoPt-based particle type medium (Hc=2 to 4.5 kOe).

In order to implement a high-density recording and reproducing apparatus, the magnetic domain walls 22 should be formed at as high a density as possible in the initial domain wall formation process of FIG. 1A, and preferably at 300 kfci. In the initial domain wall formation, since a magnetic field exceeding the nucleation coercivity Hn is applied to the recording medium, the position of the domain wall 22 to be formed next shifts in the direction of track length with the movement of the magnetic gap of the recording head 31 or the reversal of polarity of the recording field Hr. In the initial domain wall formation process, however, the position of each domain wall 22 need not be controlled very closely. It is required only that the domain walls be arranged in the same spatial frequency as the reference signal 30.

When the position of a domain wall 22 actually formed on the recording medium is displaced from that position on the track which corresponds to a rising or falling edge of the reference signal 30, the positional displacement may be treated as an offset. It is preferable that the reference signal 33 be produced from the reproduced signal for the initially formed domain walls 22.

A recording of information to the magnetic recording medium 10 is made by shifting the domain walls 22 formed in the initial domain wall formation process to the right or left of their respective corresponding reference positions 23 shown in FIG. 1C. Assuming the period of the reference signal 33 to be T, the distance that each domain wall shifts from its reference position is preferably set to about T/4 in time axis. For example, when the spatial period of the reference signal is set to 85 nm corresponding to 300 kfci, the distance that the domain wall shifts from its reference position will be about 20 nm.

When a general magnetic film, inclusive of the CoPt film in this embodiment, is used for the recording layer 12, the speed at which the domain wall 22 shifts is 1 to 10 m/s for an applied magnetic field of 1 kOe. Depending on the way to select the difference, Hr–Hw, between the recording field Hr and the nucleation coercivity Hn, the speed at which the domain wall shifts when the present invention is implemented can be estimated at about 1 to 10 m/s since that difference can be set to not less than 1 kOe. The time required for the domain wall to shift the distance of 20 nm is 2 to 20 ns.

Assume that the gap length of the recording head 31 is 100 nm and the linear speed (the relative speed of the recording medium 10 and the recording head 31) is 10 m/s, which are typical numeric values. Then, the time required for the recording medium to move past the gap of the recording head will be 10 ns. It is quite possible for the recording medium 10 to move about 20 nm below the head gap while a magnetic field large enough to shift the domain wall is being applied. Further, assuming the spatial period of the reference signal 30 to be 85 nm, the period of the reference signal is 8.5 ns and the time required to move 20 nm is 2 ns with the linear speed being 10 m/s. It is therefore feasible in signal processing to identify the direction in which the domain wall has shifted with respect to its reference position at the time of reproduction.

In the state of FIG. 1C, a recording current corresponding to a recording pattern signal is made to flow in the coil of the recording head 31 and, at the time when the center of the gap of the head faces the reference position 23, a right- or left-pointing recording field Hr (Hn>Hr>Hw) is applied to the recording medium corresponding to the recording pattern signal. Thereby, the domain wall 22 in the recording medium 12 that has been subjected to the initial domain wall formation process shifts with respect to its reference signal. Though not shown, the recording pattern signal is a PWM (pulse width modulation) signal which rises in the position of each shifted domain wall shown in FIG. 1C.

By properly setting the recording field Hr to fit the speed at which the domain wall shifts and the gap length of the recording head, each domain wall is allowed to shift a predetermined distance. In the example of FIG. 1C, after information recording the three domain walls 22, beginning with the leftmost domain wall but one, have shifted a predetermined distance (for example, 20 nm) to the left, right and left of their respective reference positions, respectively. The distance that the domain wall shifts need not be accurately set to 20 nm and is only required to fall within a range from a value for a time resolution width determined by the frequency of a clock signal used in generating the reference signal to a distance at which there is little interference between neighboring domain walls. Therefore, it does not matter that the shifted domain wall slightly changes its position under the influence of a magnetic field from the recording head 31.

As described previously, information recorded as changes in the direction in which the domain walls 22 were shifted is reproduced by identifying the direction in which the domain walls shifted with respect to their corresponding reference positions. This reproduction was performed with a shield type of MR head, having a gap length (shield-to-shield spacing) of 0.2 μm for a track width of 0.8 μm, mounted on a spin stand as the reproducing head 32 shown in FIG. 1D. The shield type of MR head has a structure such that an MR film formed along the track width is sandwiched by shield films from its both sides in the direction of the track length.

From the MR head a reproduced signal of a peak amplitude is obtained when the domain wall 23 comes immediately under the MR film. The amount of shift in time of the peak position 35 of the reproduced signal 33 with respect to the position 34 of the reference signal is on the order of 2 ns. With this level of shift, it is quite possible in signal processing to identify the direction of shift in time.

In this example, each rising position of the reference signal 30 of FIG. 1B is illustrated as a reference position 23 in FIG. 1D and a reference position 34 in FIG. 1E. Alternatively, each falling position of the reference signal may be set as a reference position or both the rising and falling positions of the reference signal may be used as reference positions for detecting reproduced signals.

The thermal fluctuation was also discussed by the inventors. An experiment for thermal fluctuation was conducted to observe variations in reproduced signal with time with information recorded on a recording medium at a density of 200 kfci. Regular observation over a period from immediately after recording (after a lapse of one second from recording) to a lapse of half a year showed a degradation of less than 1%. Thus, the inventors confirmed that there is no problem associated with thermal fluctuation.

A recording medium using a recording layer of CoCrPtTa/Cr used in conventional hard disks is one consisting of an aggregate of very tiny magnetic particles. With this medium, several hundreds of magnetic particles are needed to form one recording cell (bit). In order to enhance the signal-to-noise ratio, therefore, it is required to increase the number of particles, which involves the reducing of the particle size. Therefore, the individual particles will approach superparamagnetism, which causes a problem of thermal instability.

In contrast, with the recording medium 10 used in the magnetic recording and reproducing apparatus of the present invention, the region between each domain wall 22 acts as one magnetic unit, which is more than 100 times larger than the recording cell in the conventional magnetic-particle-based medium. This seems to be the cause of failure to observe any reduction in reproduced output due to thermal fluctuation.

The embodiment was described as using a magnetic recording medium having a recording layer consisting of a CoPt-based continuous film in which magnetization lies in the plane of the recording film. The magnetic recording method of the present invention does not have any restrictions on materials for the recording layer and the head. As the recording layer material, a variety of materials, such as a CoCr-based material, a granule-based material and so on, can be used in addition to the CoPt-based material. Additionally, the present invention can be applied to perpendicular recording using a perpendicular recording medium in which recording magnetization is formed perpendicularly to the recording surface. As the recording layer materials for perpendicular recording media, use may be made of CoPt-, CoCr- and granule-based materials that are processed to have perpendicular magnetic anisotropy. In addition, use may be made of alloys of rare earth and transition metals and Co/Pt multilayer films which are used in optomagnetic recording.

Figure 2A:
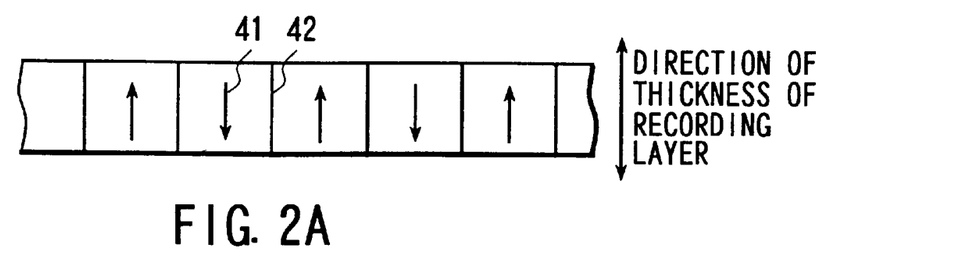
FIGS. 2A and 2B are conceptual diagrams for use in explanation of a magnetic recording and reproducing method according to another embodiment of the present invention.
Figure 2B:
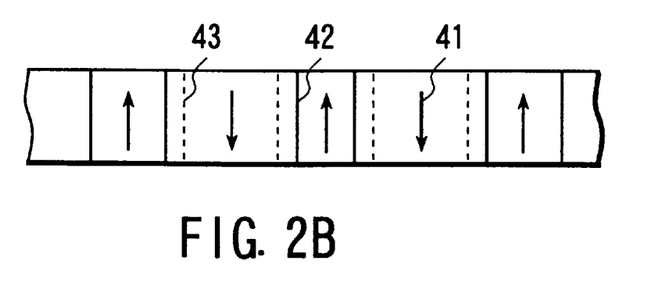

FIGS. 2A and 2B are conceptual diagrams of the perpendicular recording in accordance with the principles of the present invention.

FIG. 2A shows a recording layer of a magnetic A recording medium in the initial domain wall formed state. Magnetization 41 and domain walls 42 are produced in the direction of thickness of the recording layer, i.e., in the direction perpendicular to the film surface. In this initial domain wall formed state, the magnetic domain walls 42 are formed in reference positions regularly spaced in the direction of the length of the track. FIG. 2B shows a recorded state in which each of the domain walls 42 has been shifted from its reference position forward or backward in the direction of the length of the track in accordance with a recording pattern signal.

Further, the present invention can be applied to a lateral recording system in which recording magnetization is formed in the direction of the width of the track. An example of the lateral recording is illustrated conceptually in FIGS. 3A and 3B.

Figure 3A:
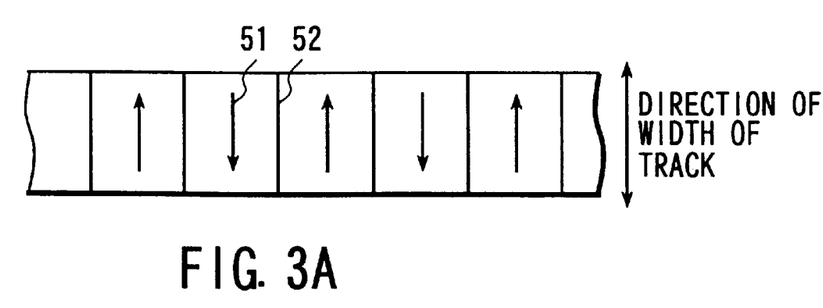
FIGS. 3A and 3B are conceptual diagrams for use in explanation of a magnetic recording and reproducing method according to still another embodiment of the present invention.
Figure 3B:
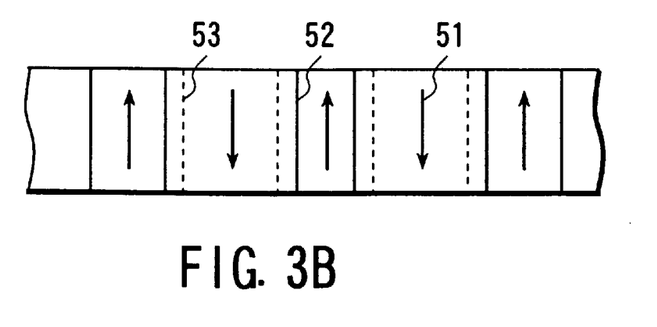

FIG. 3A shows a recording layer of a magnetic recording medium in the initial domain wall formed state. Magnetization 51 and domain walls 52 are produced in the direction of width of the track. In r this initial domain wall formed state, the magnetic domain walls 42 are formed in reference positions regularly spaced in the direction of the length of the track. FIG. 3B shows a recorded state in which each of the domain walls 42 has been shifted from its reference position forward or backward in the direction of the length of the track in accordance with a recording pattern signal.

Figure 4:
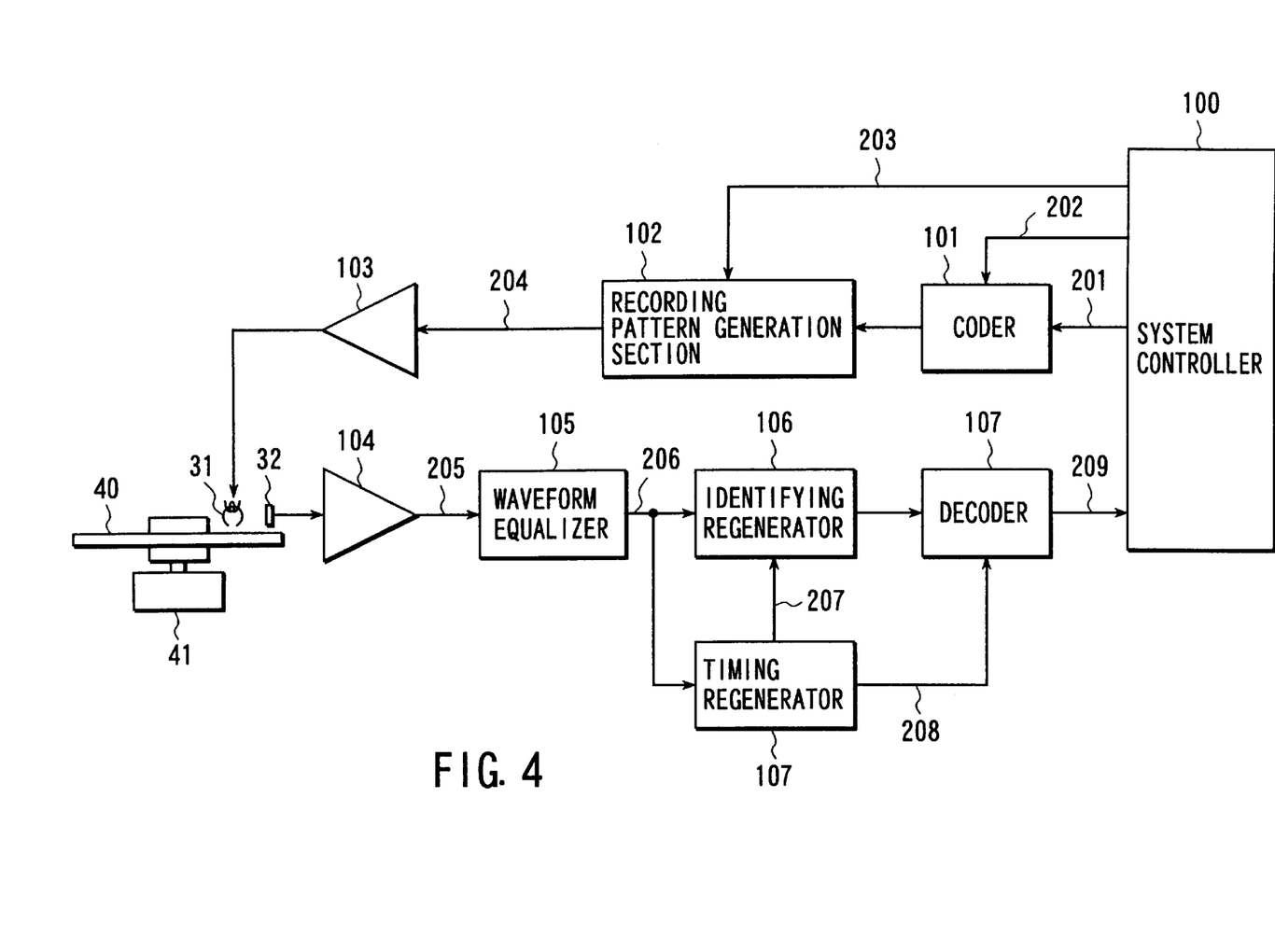
FIG. 4 is a block diagram of a magnetic recording and reproducing apparatus of the present invention.

Next, a magnetic recording and reproducing apparatus which implements the magnetic recording and reproducing method of the present invention will be described taking a magnetic disk drive as an example. FIG. 4 is a block diagram of the magnetic disk drive.

In FIG. 4, a magnetic disk 40, which is a recording medium formed with initial domain walls in regularly spaced reference positions as shown in FIG. 1A, is driven by a spindle motor 41 to rotate. A combined magnetic head assembly in which the recording head 31 and the reproducing head 32 are integrally incorporated is mounted to face the magnetic disk 40. At the time of recording and reproducing, the head is moved in the direction of radius of the disk by means of a head actuator not shown.

At the time of recording information, a recording information signal 201 is output from a system controller 100 and then coded into, for example, an NRZ-I pattern in a coder 101 in accordance with a clock signal 202 from the system controller. The resulting F coded information signal is entered into a recording pattern generator 102, which, in turn, produces a recording pattern signal 205 from the NRZ-I pattern input from the coder 101 in accordance with a reference signal 203 provided from the system controller.

Here, the reference signal 203 has a period which is an integral multiple of that of the clock signal 202. In response to the NRZ-I pattern the recording pattern generator 102 produces as the recording pattern signal 204 a PWM signal which takes the rising and/or falling edges of the reference signal 203 as its points of variation.

The recording pattern signal 204 thus produced is current-amplified by a recording amplifier 103 which supplies the recording head 31 with a recording current. Thereby, the recording head produces right- and left-pointing recording fields in response to a 1 and a 0 in the recording pattern signal 204, respectively. By these recording fields, each of domain walls formed on the track of the recording layer is shifted forward or backward by a predetermined amount. That is, as described previously, information is recorded on the magnetic disk 40 as changes in the direction of shift of the domain walls from their respective reference positions.

At the time of reproduction, a reproduced signal 205 is sensed from the reproducing head 32 through a reproducing amplifier 104 comprising a current-to-voltage converting amplifier. The reproduced signal 205 is subjected by a waveform equalizer 105 to such waveform equalization as reduces distortion resulting from the recording and reproducing system and then entered into a pattern-regenerator 106 and a timing regenerator 107.

The timing regenerator 107, consisting of a PLL circuit by way of example, regenerates from the reproduced signal 206 output from the waveform equalizer 105 a reference signal 207 and a clock signal 208 which are respectively identical to the reference signal 203 and the clock signal 202 output from the system controller 100 at the time of recording. As an alternative, the reference signal 207 and the clock signal 208 may be produced by adjusting the phase of the reference signal 203 and the clock signal 202 used in recording information in accordance with a timing signal extracted from the reproduced signal 206.

The pattern regenerator 106 detects peak positions in the output signal 206 of the waveform equalizer which corresponds to the modulated positions of domain walls and identifies in which direction each peak position in the reproduced signal 206 has been shifted in time with respect to a corresponding one of reference positions which correspond to the rising and/or falling edges of the reference signal 207 regenerated by the timing regenerator 107 which correspond to the positions of the initial domain walls (the unmodulated positions of domain walls) formed on the recording layer. In other words, the pattern regenerator 106 detects whether each peak position in the reproduced signal leads or lags in time with respect to the corresponding unmodulated domain wall position to thereby regenerate the NRZ-I pattern.

The NRZ-I pattern thus regenerated in the pattern regenerator 106 is decoded in a decoder 107 in accordance with the clock signal 208 regenerated by the timing generator 107, thereby reproducing an information signal 209 which is the same as the original information signal 201. The reproduced information signal 209 is entered into the system controller 100.

As described so far, the present invention allows the use of a domain wall shifting type of recording medium which has been considered unavailable according to the conventional concept of magnetic recording, that is, a magnetic recording medium having a recording layer consisting of a magnetically continuous film having substantially no non-magnetic regions. Therefore, even if the recording density is increased more than conventional, low noise, high density and high thermal agitation resistance requirements can all be satisfied.

Moreover, the present invention allows a recording sensitivity that is sufficiently high in practical use to be ensured. This is achieved by setting a nucleation coercivity of a recording layer of a magnetic recording medium larger than a domain wall motion coercivity, previously forming, before recording, initial domain walls in reference positions on the recording layer which are regularly spaced in the direction of length of the track, making a recording of information by applying to the recording medium a recording field smaller in strength than the nucleation coercivity but larger than the domain wall motion coercivity to shift each of the initial domain walls forward or backward in the direction of length of the track (modulate the position of each domain wall), and reproducing the recorded information by identifying in which direction each domain wall has been shifted from its reference position (unmodulated position).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A magnetic recording and reproducing method comprising the steps of:

forming magnetic domain walls in reference positions on a magnetic recording medium having a recording layer comprising a magnetic film, the magnetic film in which a nucleation coercivity for changing a direction of magnetization is larger in strength than a domain wall motion coercivity for shifting the magnetic domain walls and which has substantially magnetic regions only, the reference positions being regularly spaced in the direction of length of track; and applying a recording field to the magnetic recording medium, the recording field which is smaller in strength than the nucleation coercivity but larger than the domain wall motion coercivity to shift each of the domain walls in the recording layer from the reference position forward or backward in the direction of length of the track, whereby information is recorded.

2. The method according to claim 1, further comprising the step of, after information recording, identifying in which direction each of the domain walls has shifted from the reference position to reproduce the recorded information.

3. The method according to claim 2, wherein the recording layer is formed of a cobalt-based material.

4. The method according to claim 1, wherein the recording layer is formed of a cobalt-based material.

5. The method according claim 1, wherein the recording layer is formed of CoPt-based film.

6. The method according to claim 1, wherein the recording layer is formed of CoCr-based film.

7. The method according to claim 1, wherein the recording layer is formed of granule-based film.

8. The method according to claim 1, wherein the recording layer is formed of alloys of rare earth and transition metals.

9. The method according to claim 1, wherein the recording layer is formed of multi-layer film of cobalt and platinum.

10. The method according to claim 1, wherein the recording layer is amorphous.

11. A magnetic recording and reproducing apparatus comprising:

a magnetic recording medium having a recording layer comprising a magnetic film in which a nucleation coercivity for changing a direction of magnetization is larger than a domain wall motion coercivity for shifting the magnetic domain walls and which has substantially magnetic region only, the magnetic domain walls being formed in reference positions on the recording layer which are regularly spaced in the direction of length of the track on the recording layer; and recording means for applying a recording field to the magnetic recording medium, the recording field which is smaller in strength than the nucleation coercivity but larger than the domain wall motion coercivity to shift each of the domain walls in the recording layer from reference position of the each of the domain walls forward or backward in the direction of length of the track, whereby information is recorded.

12. The apparatus according to claim 11, further comprising reproducing means for reproducing the information by identifying whether a signal in a reproduced signal obtained through a reproducing head from the magnetic recording medium, wherein the signal in the reproduced signal corresponds to each shifted domain wall leads or lags in time with respect to a reference signal corresponding to the reference positions in the recording layer.

13. The apparatus according to claim 12, wherein the reproducing means reproduces the information by identifying in which direction each peak position in the reproduced signal is shifted in time with respect to the reference signal corresponding to the reference positions.

14. The apparatus according to claim 12, in further comprising magnetic domain wall forming means for forming the magnetic domain walls in the reference positions regularly spaced in the direction of length of the track of the recording layer by applying a magnetic field to the magnetic recording medium in accordance with a predetermined reference signal, the magnetic field being larger in strength than the nucleation coercivity.

15. The apparatus according to claim 12, wherein the recording means produces a recording pattern signal corresponding to information to be recorded in synchronization with a reference signal corresponding to the reference positions and applies the recording field through the recording head to the recording layer in accordance with the recording pattern signal.

16. The apparatus according to claim 12, wherein the recording layer is formed of a cobalt-based material.

17. The apparatus according to claim 11, further comprising magnetic domain wall forming means for forming the magnetic domain walls in the reference positions regularly spaced in the direction of length of the track of the recording layer by applying a magnetic field to the magnetic recording medium in accordance with a predetermined reference signal, the magnetic field being larger in strength than the nucleation coercivity.

18. The apparatus according to claim 17, wherein the recording means produces a recording pattern signal corresponding to information to be recorded in synchronization with a reference signal corresponding to the reference positions and applies the recording field through the recording head to the recording layer in accordance with the recording pattern signal.

19. The apparatus according to claim 17, wherein the recording layer is formed of a cobalt-based material.

20. The apparatus according to claim 11, wherein the recording means produces a recording pattern signal corresponding to information to be recorded in synchronization with a reference signal corresponding to the reference positions and applies the recording field through the recording head to the recording layer in accordance with the recording pattern signal.

21. The apparatus according to claim 20, wherein the recording layer is formed of a cobalt-based material.

22. The apparatus according to claim 11, wherein the recording layer is formed of a cobalt-based material.

23. The apparatus according to claim 11,
wherein the recording layer is formed of CoPt-based film.

24. The apparatus according to claim 11,
wherein the recording layer is formed of CoCr-based film.

25. The apparatus according to claim 11,
wherein the recording layer is formed of granule-based film.

26. The method of claim 11,
wherein the recording layer is formed of alloys of rare earth and transition metals.

27. The method according to claim 11,
wherein the recording layer is formed of multi-layer film of cobalt and platinum.

28. The method according to claimed 11,
wherein the recording layer is amorphous.

* * * * *